United States Patent [19]

Bangs et al.

[11] Patent Number: 4,661,823

[45] Date of Patent: Apr. 28, 1987

[54] THERMAL PRINT HEAD

[75] Inventors: Richard G. Bangs; Michael O. Grey, both of Ithaca, N.Y.

[73] Assignee: NCR Corporation, Dayton, Ohio

[21] Appl. No.: 749,357

[22] Filed: Jun. 27, 1985

[51] Int. Cl.⁴ .............................................. G01D 15/10

[52] U.S. Cl. ........................... 346/76 PH; 346/139 C

[58] Field of Search .............. 346/76 PH, 139 C, 155; 250/318; 214/216 PH, 543; 400/120, 118, 119, 123–125

[56] References Cited

U.S. PATENT DOCUMENTS

| | | | |
|---|---|---|---|
| 3,958,254 | 5/1976 | Okabe | 346/139 |
| 4,130,752 | 12/1978 | Conta et al. | 346/76 PH |
| 4,297,039 | 10/1981 | Lees | 400/120 |
| 4,350,448 | 9/1982 | Hanagata et al. | 400/120 |
| 4,390,884 | 6/1983 | Applegate et al. | 346/76 PH |
| 4,399,348 | 8/1983 | Bakewell | 219/216 |

*Primary Examiner*—Arthur G. Evans
*Attorney, Agent, or Firm*—Wilbert Hawk, Jr.; Albert L. Sessler, Jr.; George J. Muckenthaler

[57] ABSTRACT

A cable connection mechanism for a thermal print head includes an integral carriage and clamp assembly which is formed to receive the leads of a flat cable and which contains the print head in position to engage the cable leads. Pressure required to maintain contact of the cable leads with the print head is provided by resilient means carried in a slot in the clamp assembly.

25 Claims, 6 Drawing Figures

THERMAL PRINT HEAD

BACKGROUND OF THE INVENTION

In the area of thermal printers, it is well-known that the use of such printers is increasing for certain operations that require a reduction in noise levels and at a reasonable cost. While development work is continually progressing to increase speed of operation with minimum maintenance or care of the equipment, it is seen that improvements are being made to enable operator involvement in the maintaining of such equipment.

In the case of typewriters or like apparatus, it is common practice for the operator to replace the typewriter ribbon at periodic intervals or on an asrequired basis. It is also within the capability of the operator of a printer or like recording equipment to replace the ribbon cassette periodically or as required.

In the case of thermal printers, it is seen that the thermal print head needs to be replaced when the connector pads or runs on the surface of the print head do not operate to provide sharp and precise printing by reason of wear or for other reasons. Print head replacement is also required due to wear and eventual failure of the print element or elements. A flexible flat ribbon-like cable is normally used to connect with the pads or contact surfaces on the print head, and the individual leads or wires of the cable may include end connectors or terminals for contact with the print head pads. Since the end connectors or terminals of the individual leads may be exposed and not protected when the print head is removed, or especially in the case where end connectors or terminals are not utilized, it is necessary to ensure that the terminals or the ends of the leads are not damaged when a print head is reinstalled in the printer.

Representative prior art in the field of thermal print heads includes U.S. Pat. No. 3,958,254, issued to K. Okabe on May 18, 1976, which discloses a thermal printing head supported on a carriage, a flat cable connected to the head, and a plate spring fixed to the carriage to keep the head and the cable in a predetermined position.

U.S. Pat. No. 4,297,039, issued to R. Lees on Oct. 27, 1981, discloses a thermal printer having belt cables with individual conductors connected to printed circuit board conductors and covered with strips of insulating material. A slot through a supporting base element permits one of the belt cables to pass through and beneath the element and to connect to the circuit board.

U.S. Pat. No. 4,350,448, issued to T. Hanagata on Sept. 21, 1982, discloses a thermal head having a contact pattern and a print plate. Contact pieces are soldered to the print plate and are held in grooves in a connector body and are resiliently biased against the contact pattern to effect electrical connection. A flexible electric wire supplies signals to the thermal head.

U.S. Pat. No. 4,399,348, issued to J. J. Bakewell on Aug. 16, 1983, discloses a thermal print head wherein resistive elements are sandwiched between opposing substrates. In one case the elements are recessed to minimize wear, and in another case resistive material is deposited in channels and then ground off to the desired configuration.

SUMMARY OF THE INVENTION

The present invention relates to thermal print heads. More particularly, the invention is directed to a print head carriage and clamp assembly which is formed to receive the individual leads or wires of a ribbon-type supply cable, and which assembly both carries and contains the print head in precise position to engage with the leads or wires. Means is also provided to exert pressure on the leads or wires to maintain solid contact with the connector pads or runs of the print head.

The carriage and clamp assembly of the present invention utilizes a unitary or integral member which includes a print head carriage portion for supporting the print head in upright manner, and a clamp portion for securely containing the end of the ribbon cable. The clamp portion of the assembly occupies a lower attitude of the print head carriage and includes a notch near the upper part of the clamp portion to retain the ends of the individual leads or wires in precise position and spaced at a predetermined distance from the print head. A slot is provided in and along a central part of the clamp portion distal from the print head, and resilient means in the nature of a length of silicone rubber tubing or silicone rubber rod is placed in the slot and such tubing or rod exerts pressure against the individual leads or wires to maintain contact thereof with adjacent connector pads on the print head. A lower opening in the carriage and clamp assembly is formed to provide sharp edges or barbs engageable with the insulated portion of the ribbon cable for retaining the cable in position within the formed cavity between the print head carriage portion and the clamp portion of the assembly.

In view of the above discussion, the principal object of the present invention is to provide an improved print head assembly for a thermal printer.

Another object of the present invention is to provide an integral print head carriage and cable clamp assembly for a thermal printer.

An additional object of the present invention is to provide cable connection means for a thermal print head that enables replacement of the print head in relatively easy manner.

A further object of the present invention is to provide a unitary member for carrying the print head and for clamping the ribbon cable in secure manner.

Still another object of the present invention is to provide a ribbon cable clamping portion of a carriage and clamp assembly with means for resiliently urging the individual leads of the ribbon cable into contact with the print head.

Additional objects and advantages of the present invention will become apparent and fully understood from a reading of the following specification taken together with the annexed drawing.

DESCRIPTION OF THE PREFERRED EMBODIMENT

Figure 1:
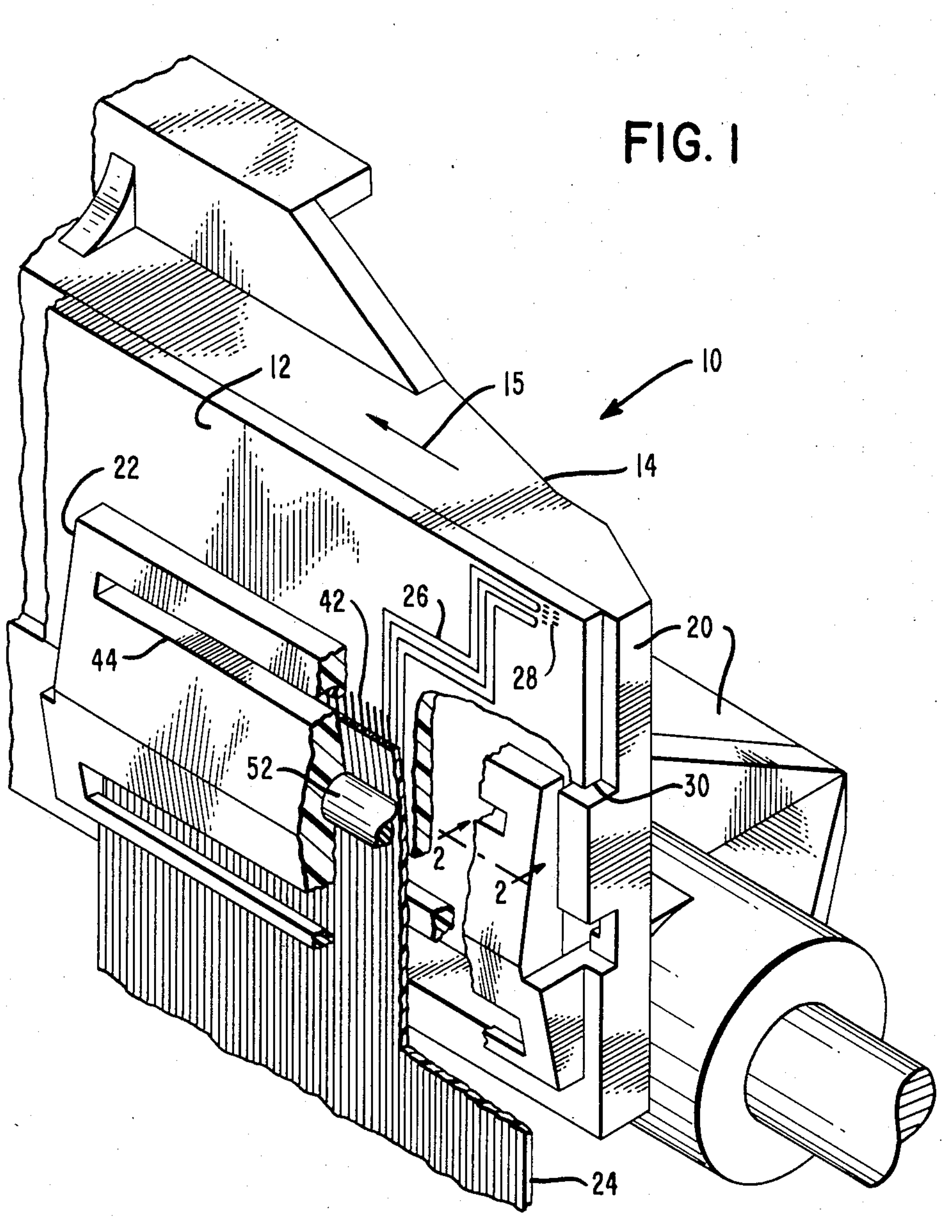
FIG. 1 is a perspective view of a portion of a thermal printer incorporating the subject matter of the present invention in a preferred arrangement thereof.

Referring now to FIG. 1, there is shown a perspective view of a portion of a printer 10 which includes a thermal print head 12 supported from and carried by a print head assembly 14. In this particular printer, printing is accomplished in the direction as indicated by the arrow 15. It is well-known that a thermal print head, as 12, provides for relatively fast and silent or noiseless operation by reason of the non-impact thermal element construction and arrangement. Thermal paper 16 (FIG. 5) is caused to be directed and driven in a path from a supply (not shown) around a platen 18 and then past the print head 12.

The print head assembly 14 comprises a first portion 20 thereof (see also FIG. 3) for use in carrying the print head 12 and another or a second portion 22 for clamping a flat ribbon-like cable 24 for supplying current and heat for printing on the thermal paper 16. The assembly 14 is of unitary construction and the two portions 20 and 22 thereof provide for supporting and carrying the print head 12 and for clamping the cable 24 in an arrangement enabling integral construction of the two portions. In the present construction, there are provided a pair of the flat cables 24, the one shown in FIG. 1 being a 20-conductor cable and termed cable No. 2. Printing is accomplished by either cable No. 1 (not shown but to the left of cable No. 2) or by cable No. 2, or by both cables, as the print head assembly 14 is moved in the direction of arrow 15.

The print head 12 includes an alumina substrate and a plurality of connector pads or runs 26 in the form of current conductors preferably made of palladium silver, or gold and which pads or runs are screened onto the substrate and which substrate also contains thermal print elements, as at 28, connected with the upper ends of the respective runs 26 engageable with the individual leads or wires of the cable 24. The carriage portion 20 includes slots, as at 30, at the sides thereof for receiving the print head 12 in vertical sliding manner when it is necessary to replace the print head.

Figure 4:
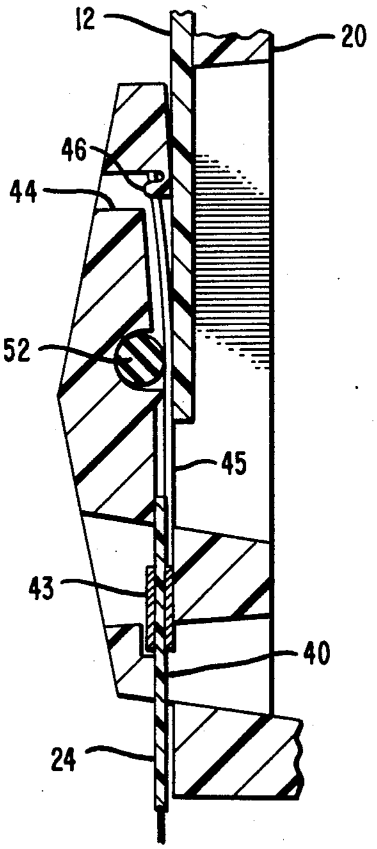
FIG. 4 is a side elevational view showing the ribbon cable installed and retained in position relative to the print head.
Figure 3:
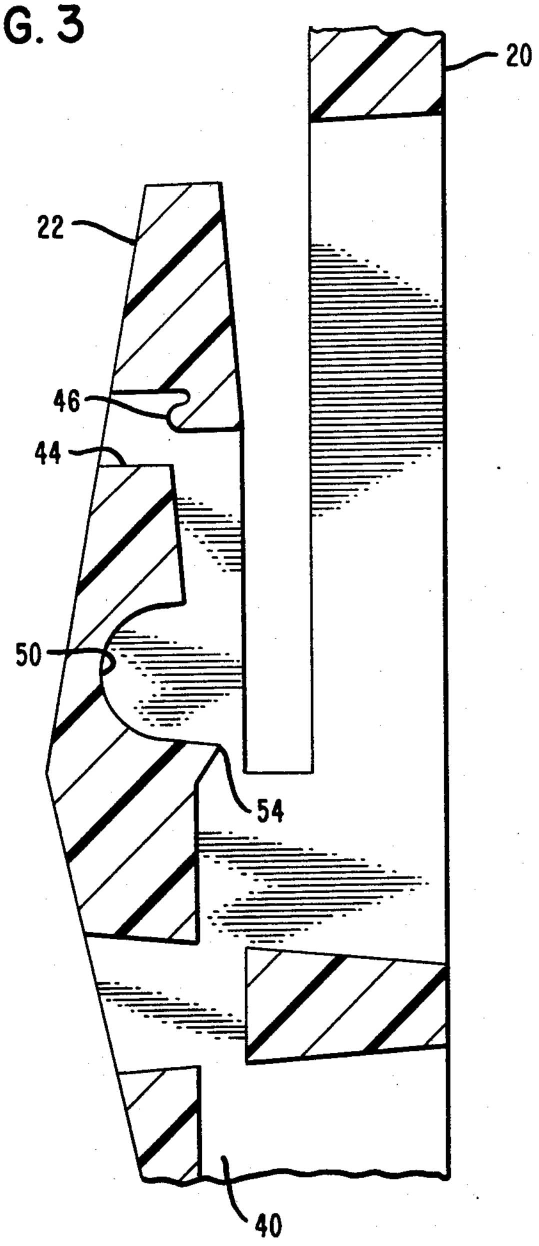
FIG. 3 is an enlarged side elevational view of the ribbon cable clamp portion of the carriage and clamp assembly.

As seen in FIGS. 3 and 4, the clamp portion 22 of the print head assembly 14 is formed in irregular shape and provides a cavity 40 for receiving the cable 24 into a position adjacent and in contact with the print head 12. As is well-known, the flat cables which are widely used in printers include a plurality of individual leads or conductors in side-by-side manner (FIG. 1) and which are insulated from each other. The flat cable, of course, is widely used and is extremely suitable for use in those printers wherein the print head travels in reciprocating motion, and printing may be performed in either or both directions of travel of the print head.

Figure 2:
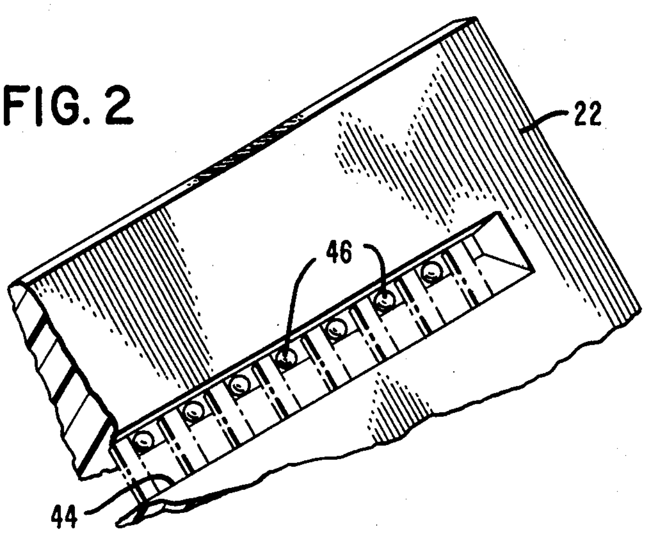
FIG. 2 is a view taken on the line 2—2 of FIG. 1.

The end of the cable 24 is not insulated in order to expose the individual leads or wires 42 so as to make good and proper contact thereof with the print head contact areas associated with the connector pads or runs 26. FIG. 1 shows the individual leads or wires 42 of the cable 24 with the cable insulation removed to expose the wires, whereas FIG. 4 includes connectors or terminals 43 crimped to the respective wires 45 as an extension of the leads of the cable 24 in a slightly modified arrangement. The clamp portion 22 includes an elongated notch 44 substantially along the length thereof for receiving the ends of the individual leads 42, as seen in FIG. 1, and for training such ends away from the upper portion of the print head 12, as seen in FIG. 4. A plurality of separation pins 46, FIGS. 2 and 3, are provided along the base or inward side of the notch 44 to space and to maintain separation of the individual leads from each other.

As seen in FIG. 3, a curved recess 50 is provided in the clamp portion 22 of the assembly 14 for receiving a short length of silicone rubber rod 52 (FIGS. 1 and 4). The silicone rubber element 52 provides constant pressure as a function of time since the material does not cold flow and therefore urges the leads 42 into and maintains contact with the connector pads or elements 26 at or near the bottom edge of the print head 12. A barb 54 along the lower edge of the recess 50, FIG. 3, serves to retain the individual leads 42 (or the extension leads 45) of the cable 24 in position during operation of the printer and prevents movement of the cable either in longitudinal or lateral direction.

Figure 5:
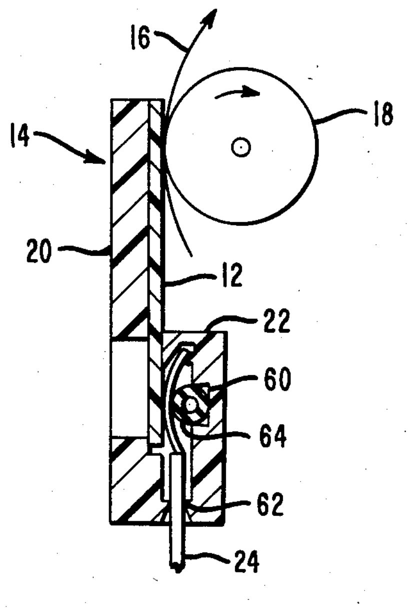
FIG. 5 is a modification of the print head carriage and clamp assembly.

FIG. 5 shows a modification of the print head assembly wherein the print head 12 is carried by the carriage portion 20 of the assembly 14, and the clamp portion 22 thereof retains the cable 24 in precise position. One difference in FIG. 5 from the preferred structure of FIGS. 1–4 is that the recess 60 for the silicone rubber tubing 64 is of square construction, which may allow the tubing to be squeezed into the corners during insertion of the cable 24. Another area of modification is that both the print head carriage portion 20 and the clamp portion 22 of the assembly 14 include two barbed edges 62 in opposed relationship for retaining the cable 24 in position.

Figure 6:
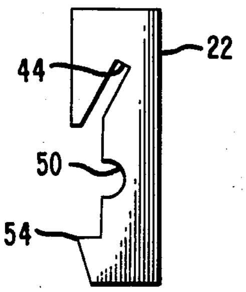
FIG. 6 is a modification of the clamp portion of the assembly.

FIG. 6 shows the clamp portion 22 having the notch or slot 44 for the ends of the leads, and also includes the curved recess 50 for the tubing 64. It is seen that while the structure of FIG. 6 does not include the separation pins 46, such pins may be incorporated therein to prevent shorting of the individual leads.

In the operation of the print head assembly 14, it is seen that the print head 12 may be easily removed by the operator of the printer 10. The print head 12 is caused to be lifted from the bottoming support, not shown, and out of the guides, as at 30 (FIG. 1), and upward away from the bare individual leads 42 or lead extensions 45 of the cable 24. While the silicone rod 52 or tubing 64 provides resilient urging of the individual leads 42 or 45 against the connector pads or elements 26 of the print head 12, the print head can be conveniently removed from the carriage portion 20 of the assembly 14. A replacement print head 12 can then be conveniently installed in the printer 10, it being seen that the bare ends of the individual leads or wires 42 or 45 of the cable 24 are removed from the path of the print head as it is being inserted into the guide slots 30 of the assembly 14 and that such leads or wires are protected and not subject to being bent by the action of installing the print head. When the print head 12 is installed and bottomed in the carriage, the rod 52 or tubing 64 again exerts pressure on the leads or wires 42 or 45 to maintain contact thereof with the connection pads 26 on the print head.

It is thus seen that herein shown and described is a print head assembly that includes a unitary member both for containing or carrying the print head and for clamping the cable for precisely positioning thereof relative to the print head. The apparatus of the present invention enables the accomplishment of the objects and advantages mentioned above, and while a preferred embodiment and a modification have been disclosed herein, other variations may occur to those skilled in the art. It is contemplated that all such variations not departing from the spirit and scope of the invention hereof are to be construed in accordance with the following claims.

We claim:

1. A connection device for a print head comprising a unitary member having an integral first portion for carrying the print head, a ribbon-type cable for operably connecting with the print head and including individual leads at one end thereof adjacent and in contact with the print head, a second integral portion of said unitary member for holding said cable relative to the print head, and resilient means carried by the second integral portion and engageable to directly contact the individual leads which extend beyond one end of said cable for urging the leads into contact with the print head.

2. The connection device of claim 1 wherein the unitary member includes means for retaining the cable in position relative to the print head.

3. The connection device of claim 1 wherein the unitary member first portion comprises an upright member for carrying the print head.

4. The connection device of claim 1 wherein the ribbon-type cable includes a plurality of spaced, bare conductors at one end thereof.

5. The connection device of claim 1 wherein the second portion of said unitary member defines a recess therein for containing the resilient means.

6. The connection device of claim 1 wherein the print head includes a plurality of connection pads and the resilient means urges the individual leads of the cable into contact with said pads.

7. The connection device of claim 1 wherein the resilient means is a length of tubing urging the individual leads against the print head.

8. The connection device of claim 2 wherein the cable retaining means comprises at least one barb on the second portion of the unitary member.

9. The connection device of claim 1 wherein the second portion of said unitary member defines a notch therein for receiving the ends of the individual leads of said cable.

10. The connection device of claim 1 wherein the second portion of said unitary member includes a plurality of projections for maintaining separation of the individual leads of said cable.

11. The connection device of claim 1 wherein the resilient means is a length of rod-like element urging the individual leads against the print head.

12. A print head assembly comprising means for supporting the print head, cable means for operably connecting with the print head and including individual leads at one end thereof adjacent and in contact with the print head, means integral with the supporting means for positioning the cable means relative to the print head, and resilient means carried by the integral means and engageable to directly contact the individual leads which extend beyond one end of said cable means for maintaining the leads in contact with the print head.

13. The print head assembly of claim 12 wherein the integral means defines a recess therein for containing the resilient means.

14. The print head assembly of claim 12 wherein the print head includes a plurality of connection pads and the resilient means urges the individual leads of the cable means into contact with said pads.

15. The print head assembly of claim 12 wherein the resilient means is a length of tubing urging the individual leads against the print head.

16. The print head assembly of claim 12 wherein the integral means includes edge means for retaining the cable means in position relative to the print head.

17. The print head assembly of claim 16 wherein the edge means comprises at least one barb engageable with the cable means.

18. The print head assembly of claim 12 wherein the integral means defines a notch therein for receiving the ends of the individual leads of the cable means and projection means for maintaining separation of the leads.

19. The print head assembly of claim 12 wherein the integral means includes a plurality of projections for maintaining separation of the individual leads of said cable means.

20. The print head of claim 12 wherein the resilient means is a length of rod-like element urging the individual leads against the print head.

21. A cable connection mechanism for a print head comprising a cable having individual leads at one end thereof adjacent and in contact with the print head, integral clamp means adjacent the print head for positioning the cable relative thereto, said clamp means defining edge means engageable with the cable for retaining thereof in position and defining elongated notch means for receiving the ends of individual leads of the cable, and resilient means carried by the integral clamp means and engageable to directly contact the individual leads which extend beyond one end of the cable for urging the leads into contact with the print head.

22. The cable connection mechanism of claim 21 wherein the clamp means defines a recess therein for containing the resilient means.

23. The cable connection mechanism of claim 21 wherein the clamp means includes a plurality of projections for maintaining separation of the individual leads of the cable.

24. The cable connection mechanism of claim 21 wherein the resilient means is a length of tubing urging the individual leads against the print head.

25. The cable connection mechanism of claim 21 wherein the resilient means is a length of rod-like element urging the individual leads against the print head.

* * * * *